Sept. 10, 1963     F. SEEGER     3,103,083
SILO CLOSURE
Filed June 9, 1959     2 Sheets-Sheet 1

Inventor
Fritz Seeger
By Stevens Davis Miller & Mosher
Attorneys

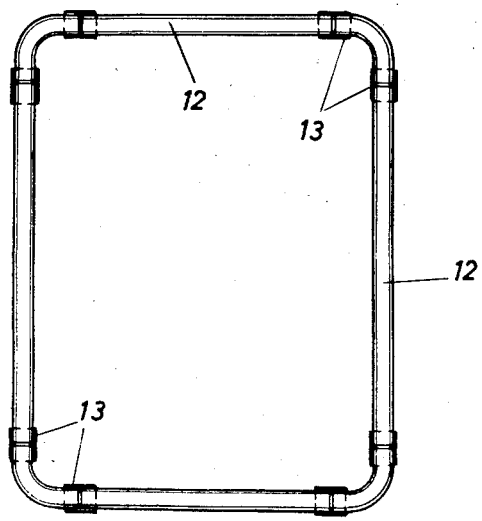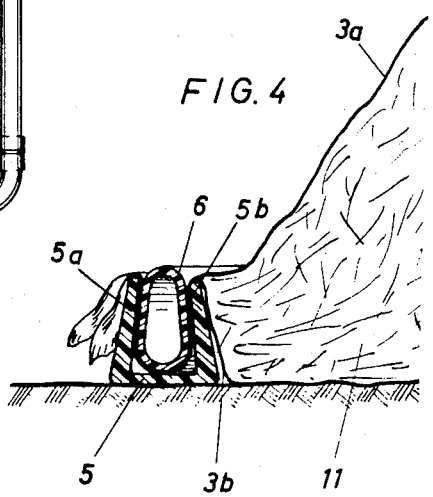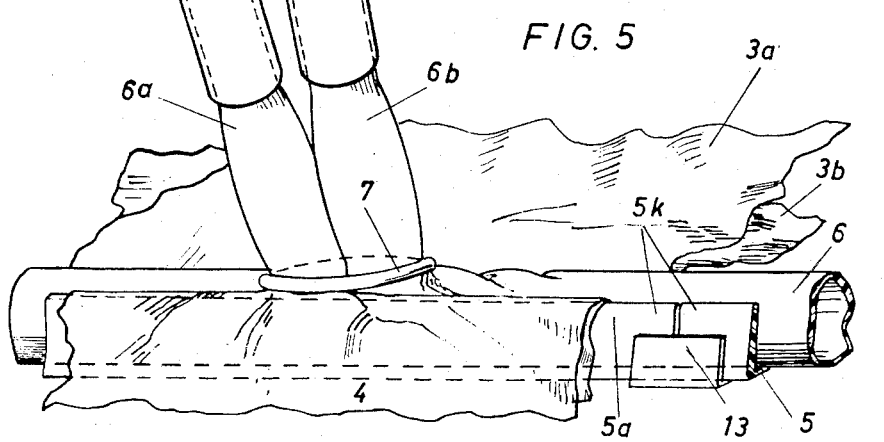

United States Patent Office

3,103,083
Patented Sept. 10, 1963

---

3,103,083
SILO CLOSURE
Fritz Seeger, Wurmseeplatz 9, Munich, Germany
Filed June 9, 1959, Ser. No. 819,173
Claims priority, application Germany June 19, 1958
5 Claims. (Cl. 50—1)

The invention relates to a sealing device for silos for fermenting foodstuffs or vegetables, said silos being either permanent brickwork, wood, sheet metal structures or the like, or auxiliary silos erected on the open field.

For the sealing off of brickwork silos for fermenting fodder, covers of sheet metal, wood, or plastic materials are used, whereby an airtight seal is attempted in many designs by submerging said cover into a channel filled with a liquid. These covers are difficult to handle and may, for example with larger silos, be lifted and fitted only by means of mechanical lifting devices. According to the charge of the silo, the sinking in of the fodder gives rise to the formation of a more or less extended space of air above the material, which, owing to the action of the oxygen, has an adverse effect on the fermentation process. For this reason, it has already been suggested to seal off the fermenting fodder, immediately along its surface, by means of water-filled channels or troughs, or by the application of so-called silo paper. However, these auxiliary means require a comparatively high expenditure of labour. Furthermore, it is unavoidable to prevent oxygen from the air from penetrating to the fermenting fodder through the cracks or interspaces between the sealing means and the walls of the silo.

Methods are also known, whereby a channel or ditch is made in the fermenting fodder within the silo near the walls of the latter, and the surface of the fermenting fodder is covered by a sealing foil. An inflatable hose is placed above said sealing foil in the channel, which hose should press by its own tension radially against the silo walls. However, it became apparent that this sealing pressure of the hose against the walls of the silo is very low, and that the inflated hose has a tendency to spread towards the inside, of the silo. If the fermenting fodder in the silo sinks in, or if the sealing foil is slightly inflated by the formation of fermentation gases, the low pressure exercised by the hose against the walls of the silo is no longer capable of resisting the forces acting on it through the sealing foil, so that it is pulled away from the walls towards the inside of the silo.

Also known are auxiliary silos for agricultural produce, which are erected on the open field or at any other suitable location. Several of these known types of auxiliary silos require a certain preliminary treatment of the storage material, for example with green fodder the pressing into bales. Other designs of these auxiliary silos necessitate a considerable expenditure of labour, for example by digging storage holes or ditches. However, all these auxiliary silos have the disadvantage that the material cannot be stored therein under a completely airtight seal. It is, for example, known to dig a flat ditch in the field, into which the material to be stored is placed, and subsequently pressed down by means of tractors. Then a plastic foil is fitted over the heap, the edges of which are covered with soil. However, this layer of soil—as well as the soil itself—allows a certain amount of oxygen from the air to penetrate, so that it is impossible to avoid a corresponding reduction of the feeding value of the stored fodder by undesirable decomposition or fermentation.

The present invention provides for a universal sealing device, which is suitable both for the sealing of permanently constructed silos and for the erection of auxiliary silos on the open field. A particular advantage of the sealing device according to this invention is the completely airtight seal provided by the same, as well as its long life, even under rough operating conditions, due to its simple and efficient design. The sealing device for silos according to the present invention is characterized by a frame, consisting of one or several parts, and comprising a trough or channel with U-shaped cross-section, into which are pressed the edges of the sealing foil or foils together with an oblong and elastic sealing member.

Other objects and advantages of the invention will appear from the following description and from the accompanying drawing, in which:

FIG. 3 is a view of a frame for the erection of an auxiliary silo;

FIG. 4 is a part section of said auxiliary silo;

FIG. 5 shows a perspective view of a detail on an enlarged scale.

Figure 1:
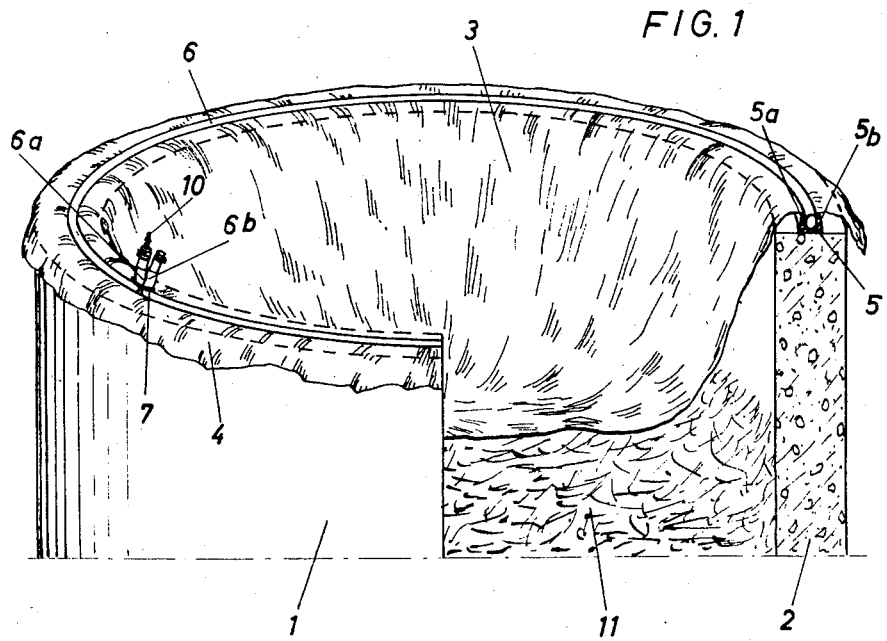
FIG. 1 shows a perspective partially sectional view of a brickwork silo, sealed by means of a sealing foils.
Figure 2:
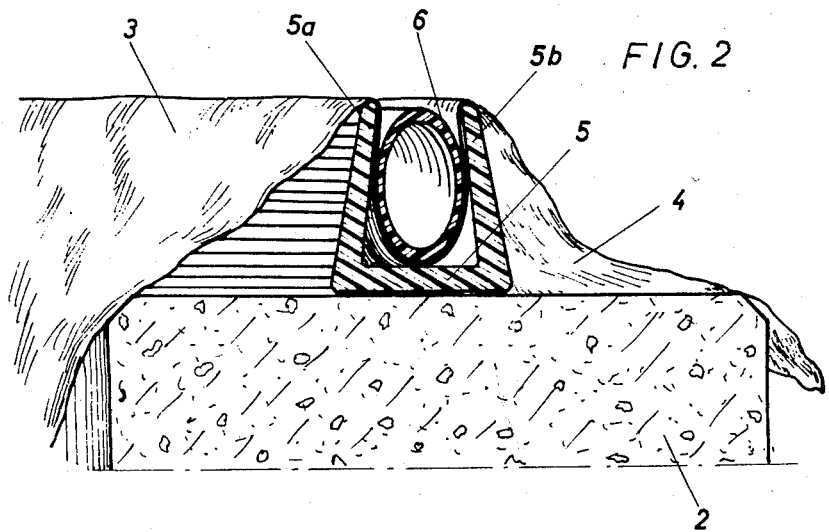
FIG. 2 shows a cross-section of the upper front edge of the wall of said silo on an enlarged scale.

The closing device according to the invention is suitable for silos of any size or cross-section. FIG. 1 shows a circular silo 1, the walls 2 of which may be constructed of brickwork, concrete, or any other suitable material. The open, top front side of said silo is covered by means of a flexible foil 3, which is preferably made of impermeable plastic material. The edges 4 of said sealing foil 3 project somewhat beyond the wall of the silo, in order to protect the walls 2 from the effects of the weather, whilst the shape of the edge 4 of the sealing foil 3 corresponds approximately to the shape of the edge of the silo. However, the diameter of the sealing foil 3 is considerably larger than that of the silo 1, so that the silo may be charged with fodder far beyond its normal capacity in such a way that the sealing foil 3 forms a hood-shaped cover over the projecting heap of fodder.

The upper edge of the silo 1 carries a frame 5 with U-shaped cross-section, made of rigid plastic material, and consisting of one or several pieces. The legs 5a and 5b of said frame converge towards the open side of the profile, so that the base of the frame channel is somewhat wider than the upper, open, end. Into this channel provided in the frame, the edge 4 of the foil cover 3 is pressed in, together with a hose 6 made of soft, elastic material, such as, for example, rubber or plastic. The ends 6a and 6b of said hose 6 are kept together by a clamp 7 or by a piece of cord. Said ends 6a and 6b of the hose 6 are closed by means of the stoppers 8a and 8b respectively, as shown in FIG. 5. The stopper 8a is equipped with a valve 10, for example an ordinary bicycle tire valve.

The closing device operates in the following manner: With the silo 1 filled with fermenting folder 11, the sealing foil 3 is pulled over the plastic frame 5. The hose 6 is pressed from the top into the channel of the frame 5, together with the edge 4 of the sealing foil 3. The hose 6 is inflated through the valve 10. The air pressure prevailing in said hose 6 causes the same and the edges 4 of the sealing cover 3 to be pressed against the inner walls of the legs 5a and 5b of the ring 5, which inner walls converge towards the top. As shown in practice, this pressure is sufficient to equalize all existing small irregularities and to give rise to an absolutely airtight seal. If fodder 11 is to be extracted from the silo 1, or if said silo is to be replenished, the valve 10 is opened, enabling the hose 6 to be lifted out easily from the channel in the frame. Since the hood-shaped sealing foil cover 3 adapts itself within very wide limits to different filling levels of the silo, only a small free space remains above the folder 11. As shown in practice, the free oxygen of the air present in this space is very quickly expelled by the carbon dioxide forming by the initially occurring process of fermentation. Green fodder stored in this manner exhibits excellent, hitherto unobtainable properties even after prolonged storage, because the silo contains, due to the sealing device described by this invention, even after very long storage times an atmosphere with very low oxygen content. If, in consequence of the formation of carbon dioxide, the internal pressure within the silo rises above the level of the air pressure in the hose 6, the surplus carbon dioxide is allowed to escape through the sealing device. In this manner an additional safeguard is provided, whereby the sealing foil 3 is prevented from bursting in consequence of excessive pressure within the silo 1. On the other hand, however, no air can penetrate from the outside into said silo through the sealing device.

The frame is fixed to the upper front edge of the side wall 2 of the silo 1 expediently by clamp-shaped clips 13 in that way, that first a number of such clips 13 are fixed at intervals to the upper silo edge by means of nails or screws. Next the plastic channel 5 is inserted into said clips. Since this plastic channel 5 may be slightly deflected in a lateral direction, usual commercially obtainable channels of identical dimensions may be used for silos of widely varying diameters. The two free ends 5k of the plastic channel, or, if said plastic channel 5 consists of several parts, the various joints, are arranged so that they are located within the reach of one clip, as shown in FIG. 5. Next said plastic channel 5 and the clips 13 are connected to the wall 2 of the silo, in such a way as to form an airtight joint, which is carried out expediently by applying a layer of concrete. As shown in the drawing, the clips 13 are designed expediently with a base plate, which is wider than the base of the plastic channel 5, and of two legs, which are bent upwards, and the distance between which is smaller than the width of the channel base 5. The clips 13 may be of plastic or metal.

As shown in FIGS. 3 to 5, the sealing device according to this invention is also suitable for the erection of an auxiliary silo on the open field. According to FIG. 3, for this purpose a frame 12 is formed from straight and/or curved sections of the U-sectioned plastic channel, the joints of which are connected by means of clips 13. A ground foil or sheet 3b of plastic material is placed above said frame in such a way as to cover the same completely, and the material to be stored 11 is heaped on said ground foil 3b. Said heap is then covered by a covering foil 3a. Next the edges 4 of both foils are pushed into the plastic channel by means of the hose 6. Finally said hose 6 is inflated by means of the valve 10.

If no foils are available with sufficient width and/or length to cover frame 12, both the ground and the covering foils 3b and 3a respectively may be composed of several parts. The overlapping edges of said foil sections are connected by being placed over a channel 5, whilst a hose 6 is pushed together with the edges into said channel from the other side.

The sealing device for silos described herein may be modified in several respects. With newly erected concrete silos, an appropriate channel with U-shaped cross-section may be provided on the upper edge during the casting of the concrete. Furthermore, the plastic channel has, in practice, been replaced with success by channels of artificial stone, wood, or sheet metal. The sealing device is suitable for silos of all designs, for example silos with round, square, rectangular or polygonal cross-sections. Where no absolutely airtight seal is required, the inflatable hose 6 may be replaced by a solid, resilient sealing member, for example by a cylindrical foam rubber body. According to the intended application, the covering foils may have various characteristics affecting their permeability. In this manner it is possible to vary the composition of the gas cushion within the silo. Although plastic foils are preferred in view of their low costs, their durability and their other properties, also covers of other material may be used, such as, for example, laminated fabrics, rubber, or another foil material provided with a coating of varnish. Also disinfecting or inhibitory gases or vapours may be injected, in which case the effective seal provided by the invention will maintain the essential composition of the selected gas atmosphere even with storage periods of several months.

What I claim is:

1. In a silo, a continuous rigid peripheral body provided with a continuous channel defining an enclosed area, the side walls of said channel having relatively little vertical curvature and converging upwardly, at least one impervious flexible foil member overlying said body and said enclosed area and having portions received continuously in said channel around the body, and an inflatable elastic sealing tube disposed in the entire length of said channel over said foil member portions and in engagement therewith and being substantially rounded in cross-sectional contour when inflated and urging the foil portions into contact with limited areas of the opposing side walls of the channel, holding said foil member portions in the channel and allowing gas leakage therepast when the gas pressure within said enclosed area is substantially greater than the pressure outside said enclosed area.

2. The structure of claim 1, and wherein said body is the wall of a storage vessel and said channel is at the top edge of said wall.

3. The structure of claim 1, and wherein there are two impervious flexible foil members superimposed over each other, with superimposed portions of both foil members continuously received in said channel.

4. The structure of claim 1, and wherein the sealing tube is closed by plugs at both ends.

5. The structure of claim 4, and wherein one of the plugs contains a valve.

References Cited in the file of this patent

UNITED STATES PATENTS

| | | |
|---|---|---|
| 738,847 | Rummel | Sept. 15, 1903 |
| 2,460,853 | Siple | Feb. 8, 1949 |
| 2,538,875 | Laird | Jan. 23, 1951 |
| 2,647,657 | Krupp | Aug. 4, 1953 |
| 2,685,071 | McCreary | July 27, 1954 |

FOREIGN PATENTS

| | | |
|---|---|---|
| 151,004 | Austria | 1937 |
| 1,018,834 | France | 1952 |
| 1,089,634 | France | 1954 |